United States Patent [19]

Hammes, Sr. et al.

[11] 3,840,365

[45] Oct. 8, 1974

[54] METAL RECOVERY PROCESS

[75] Inventors: Kenneth W. Hammes, Sr.; Kenneth W. Hammes, Jr.; Timothy L. Hammes, all of P.O. Box 551, Sedona, Ariz. 86336; Paul Kayser, Houston, Tex.

[73] Assignee: said Kayser assor. to said Keneth W. Hammes, Kenneth W. Hammes, Jr., and Timothy L. Hammes

[22] Filed: Sept. 27, 1971

[21] Appl. No.: 184,029

Related U.S. Application Data

[63] Continuation-in-part of Ser. No. 31,740, April 24, 1970, abandoned, which is a continuation-in-part of Ser. No. 706,099, Feb. 16, 1968, abandoned.

[52] U.S. Cl............... 75/101 R, 75/109, 75/117, 75/118, 75/121, 204/248, 117/130 R
[51] Int. Cl.. C22b 11/04, C22b 15/08, C22b 61/04
[58] Field of Search.......... 75/117, 118, 121, 101 R, 75/103, 109, 114, 115, 119, 120; 204/106–108, 109, 111, 248; 117/130 R

[56] References Cited

UNITED STATES PATENTS

| | | | |
|---|---|---|---|
| 659,339 | 10/1900 | Collins | 75/117 |
| 759,191 | 5/1904 | Rider | 75/117 |
| 1,539,712 | 5/1925 | Christensen | 75/114 |
| 3,260,593 | 7/1966 | Zimmerley et al. | 75/117 |
| 3,634,071 | 1/1972 | Spedden et al. | 75/117 X |

Primary Examiner—Oscar R. Vertiz
Assistant Examiner—J. Cooper
Attorney, Agent, or Firm—Carl B. Fox, Jr.

[57] ABSTRACT

The disclosure is of a process for recovery of metals, including copper and, where present in sufficient quantities, uranium, gold, and silver, from ores. According to the process, the ores are leached and the recovered metals are deposited on metal sheets, particularly on sheets of iron or aluminum. The metals to be recovered are leached from the ore by highly buffered leach solutions of controlled pH in the range of 2 to 4.

2 Claims, 3 Drawing Figures

METAL RECOVERY PROCESS

This application is a continuation-in-part of application Ser. No. 31,740, filed Apr. 24, 1970, which in turn is a continuation-in-part of application Ser. No. 706,099, filed Feb. 16, 1968 both now abandoned.

BACKGROUND OF THE INVENTION

1. Field of the Invention:

The field of the invention is the field concerning the recovery of metals from ores. The principal metals which can be recovered include copper, uranium, gold and silver. Other metals may also be recovered through proper modification of the process.

SUMMARY OF THE INVENTION

In summary, the invention contemplates the recovery of metals, especially copper, uranium, silver, and gold, from ores by novel processes involving the leaching of the metals to be recovered from the ores with highly buffered solutions, of controlled pH between about 2.0 and about 5.0, containing acid, base, and salt. The leach solution is filtered and delivered to recovery vessels wherein are supported metal plates, usually of iron or aluminum, upon which the metals to be recovered deposit. When the plates become loaded with metal, they may be struck or vibrated, or the like, to remove the recovered metal therefrom.

The invention will be useful in connection with recovery of copper and other metals from low grade ores, recovery of which, has not been economical according to previously known processes and treatments. The process will be most used in connection with recoveries from low grade ores, although the process may be used to recover metals from higher grade ores as well.

The metal recovery processes herein disclosed are readily distinguishable over prior art processes such as those disclosed in U.S. Pat. Nos. 649,296, 659,339, 759,191, 1,111,874, 1,115,523, 1,326,463, 1,431,130, 1,539,712, 1,648,761, 1,891,532, 2,687,953, 2,970,096, and 3,476,554. No other patents in the field are known to applicants.

According to the present invention, the highly buffered leach solution is prepared by addition of acids, bases, and salts to water, the leach solution concentrations being, acid, 0.5–40% by weight, base, 5–40% by weight, and salt, at least 5% by weight. The concentrations should not be such as to form precipitates which would contaminate the copper product. Acids and bases in the leach solution of course interreact to form salts, and the pH is affected by the salts and by any excess acid or base. The total percentage of acid, base and salt employed in the solutions may vary from about 10% to about 65%, by weight.

No process shown in the prior art contemplates the recovery of copper from ores containing 2% copper, or less. For higher grade ores, more efficient recoveries may be made using conventional processes. The conventional processes, however, are very inefficient when applied to the very low grade ores.

A principal object of the invention is to provide an economical process for recovery of copper, uranium, gold, and silver from ores.

Another object of the invention is to provide such processes wherein raw material cost is minimized, wherein recovery is efficient and economical, and wherein the recovered metals are of high purity.

A further object of the invention is to provide such recovery processes wherein the plant investment is low whereby the processes may be employed in plants of small size and involving small investment, whereby transportation of ore to the plant over long distances may be avoided by location of one or more small plants relatively close to the ore deposits.

Other objects and advantages of the invention will appear from the following detailed description of preferred embodiments thereof, reference being made to the accompanying drawings.

DESCRIPTION OF THE PREFERRED EMBODIMENTS

Figure 1:
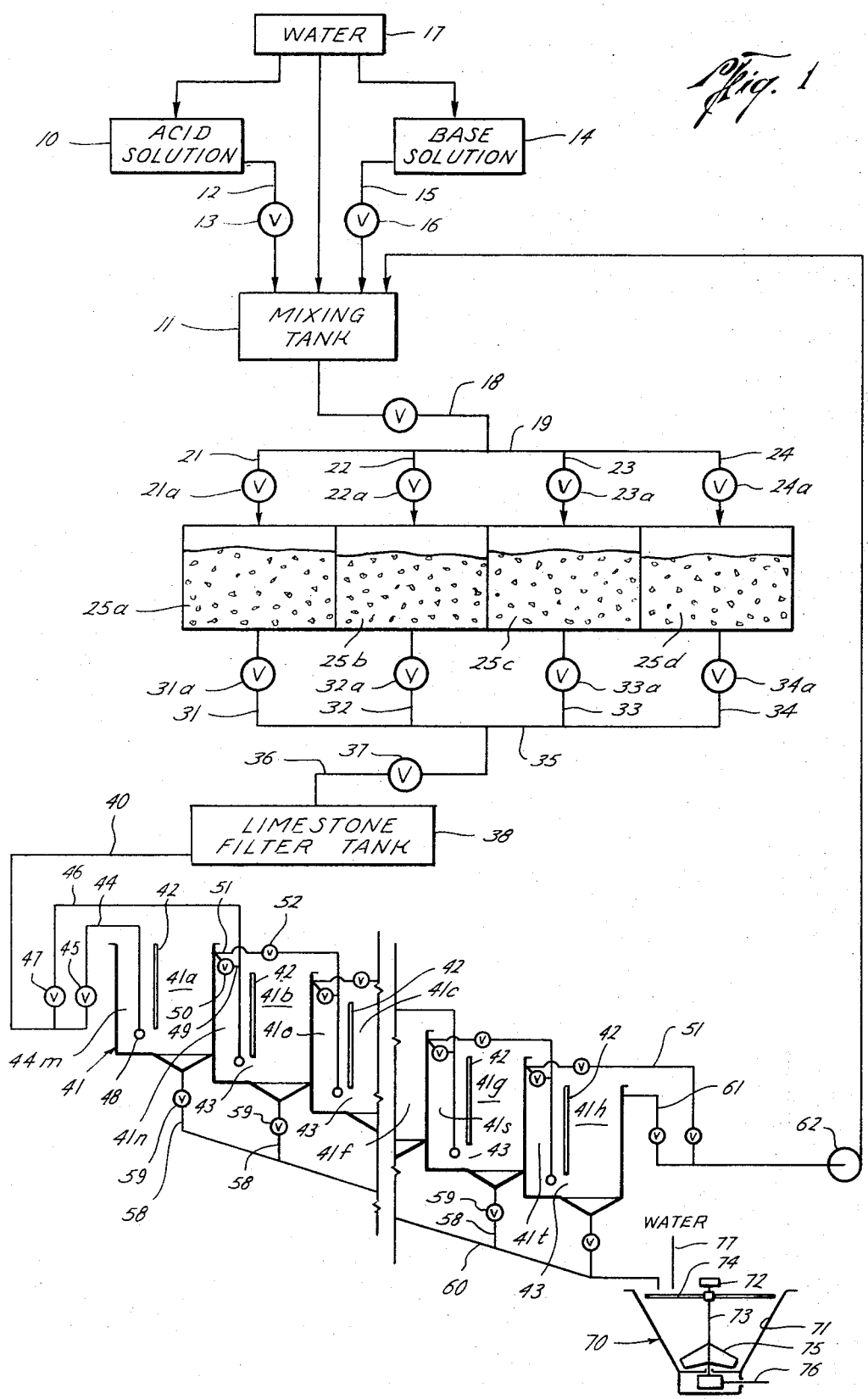
FIG. 1 is a process flow diagram of a preferred embodiment of the process according to the invention.
Figure 2:
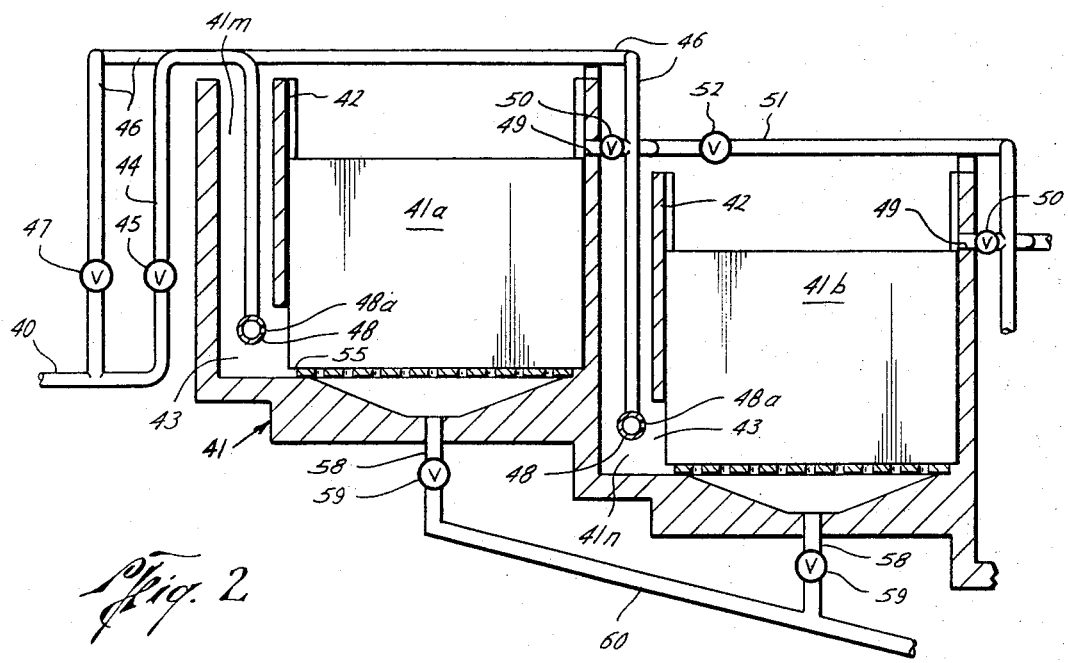
FIG. 2 is a vertical cross sectional view of a recovery tank system of preferred form for use with the process of FIG. 1.

A preferred embodiment of the invention will now be described, with reference to the described drawing figures. Referring first to FIG. 1 of the drawings, there is shown a tank or other supply of an acid solution, or a mixed acid solution, referred to by reference numeral 10. Acid from tank 10 may be delivered to mixing tank 11 through pipe 12 by opening of valve 13. In tank 14, or other supply installation, there is maintained a supply of a base solution, or mixed base solution, which may be delivered to mixing tank 11 through pipe 15 by opening valve 16. Water may be delivered to tank 11 from source 17, as required. Acids, bases, salts and water may be added to tank 11 in any other suitable manner.

The solution of mixed acid(s) and base(s) in mixing tank 11 is delivered through pipe 18, manifold 19, and branch feed pipes 21–24 to leach tank 25 having leach compartments 25a, 25b, 25c, and 25d, by opening valves 21a–24a. The leach compartments contain ore from which copper, uranium, gold and/or silver, may be extracted. The liquid level in the leach tanks is maintained to substantially cover the ore therein. From the leach compartments, the drain pipes 31–34 controlled respectively by valves 31a–34a are connected by manifold pipe 35 to outlet pipe 36 flow through which is controlled by a valve 37. Pipe 36 leads to limestone filter tank 38, from which pipe 40 delivers the leach solution into the first chamber 41a of a recovery tank 41. Tank 41 includes serially connected recovery chambers 41a, 41b, through 41g, 41h, eight recovery chambers in all. Each recovery chamber 41a–41h has a wall 42 extending partway down from its top, providing a full-width underflow passage 43 therebeneath. Chambers 41a–41h are progressively at lower levels to provide gravity flow from one chamber to the next in the direction, 41a to 41h. The chambers are shown of integral construction, but other chamber constructions, integral or separate, may be used.

Filtered leach liquor is delivered to the recovery chambers through pipe 40. Pipe 40 connects with pipe 44 having valve 45, and with pipe 46 having valve 47. Pipe 44 leads upward, over, and downward into entrance chamber 41m to the left of wall 42 of chamber 41a as shown in FIG. 1. The chambers 41a–41h each has, respectively, an entrance chamber 41m–41t, each to the left of the wall 42 of the chamber. At its end, pipe 44 is connected to a perforated pipe 48, disposed crossways above the floor of the entrance chamber, and below the lower edge of the wall 42.

Pipe 48 has a plurality of holes 48a equally spaced in a line along its edge facing horizontally beneath wall 42. For example, in an installation wherein pipe 48 is 4 inch plastic pipe, there could be twenty holes 42a of 1 inch diameter spaced over its length. The purpose of the perforated pipe is to distribute and intermix incoming leach liquor with the leach liquor already in the chamber, and to create fluid agitation in the chamber in order to increase the rate of chemical reaction.

Figure 3:
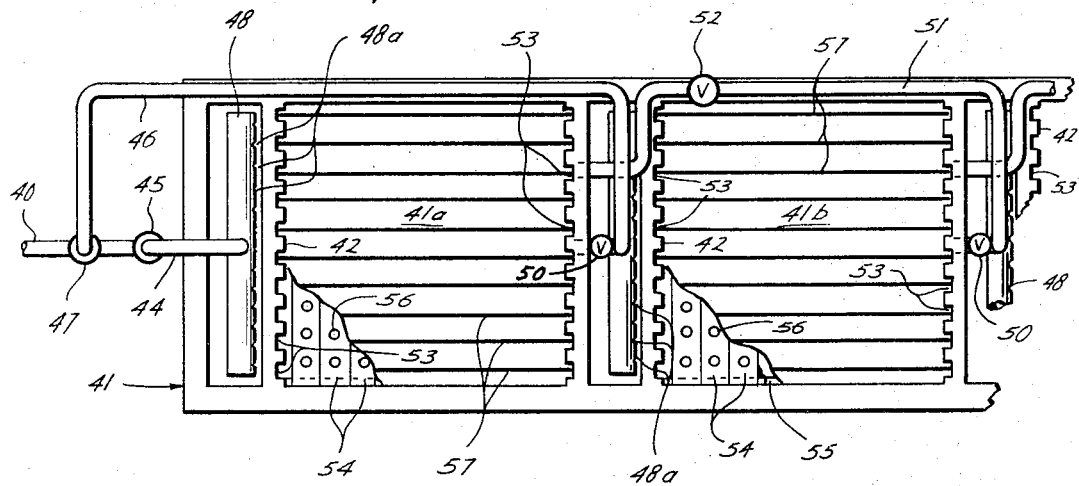
FIG. 3 is a plan view of the apparatus shown in FIG. 2, partly broken away to show lower portions of the apparatus.

Pipe 46 extends up and back, and then along the back wall of chamber 41a, as shown in FIG. 3, then forward and down into the entrance chamber 41n of chamber 41b. A pipe 49 having valve 50 connects to pipe 46 at an overflow outlet from chamber 41a at the top of entrance chamber 41n. With valve 50 open, leach liquor from chamber 41a flows by gravity into chamber 41b through pipes 49, 46 and the perforated cross pipe 48, exiting through the holes 48a thereof.

A second overflow pipe 51 from chamber 41a, at the same level as pipe 49, extends to the wall 42, then back, and then through valve 52 into the entrance chamber 41o of the next recovery chamber 41c. The flow provisions to the successive recovery chambers to the final chamber 41h, are the same, the overflow pipes 49 and 51 being provided in each case. When all recovery chambers 41a–41h are in operation, valve 47 and all valves 52 are closed, valve 45 and all valves 50 being open, so that liquor flows through all recovery chambers 41a–41h in succession. With the piping arrangement as described, any recovery chamber may be taken out of operation and drained, cleaned, and/or repaired. For example, if chamber 41a is to be taken out of operation, valve 45 is closed and valve 47 is opened to feed liquor to chamber 41b. If chamber 41b is to be taken out of operation, valve 47 is closed, valve 45 is open, the valve 50 above entrance chamber 41n is closed, and the valve 52 at the pipe 51 overflow from chamber 41a is open, so that liquor flows from chamber 41a into chamber 41c. Any other chamber may be taken out of service in the same manner.

Each recovery chamber 41a–41h has one of the entrance chambers 41m–41t, and a larger chamber at the other side of the wall 42. Wall 42 and the opposite wall of each larger chamber have plural uniformly spaced vertical slots 53. Plural wood planks 54 are supported side by side on a shoulder 55 around the chamber sides, each plank having spaced holes 56 therethrough closely spaced over its area. A plurality of rectilinear parallel metal plates 57 have their vertical edges freely disposed in opposite facing slots, their lower edges resting across planks 54. Plates 57 are preferably iron plates, but other metals can be used as will be later explained.

The bottoms of the entrance chambers 41m–41t are flat, and the larger chamber bottoms are sloped downward to a center drain outlet. A drain pipe 58 having a valve 59 is connected from each recovery chamber drain outlet to a header pipe 60, which leads to a washer and concentrate thickener 70.

The filtered leach liquor delivered to the recovery chambers 41a–41h flows from the holes 48a in a direction between the plates 57. Copper, uranium, gold and/or silver deposites on both sides of each plate, the liquor frowing from recovery chamber to recovery chamber along the series. From the final chamber 41h the spent liquor flows through pipe 61, and is recycled by pump 62 through pipe 63 back into mixing tank 11 for reuse. In case recovery chamber 41h is out of use, the recycle liquor flows from chamber 41g through the pipe 51 from chamber 41g, this pipe being connected to pipe 61 which leads to pump 62.

Copper deposits on both sides of plates 57 in layers approximately one-fourth inch in thickness, and then it begins to drop to the bottom of the recovery tank, through the holes 56 in planks 54. After a quantity of precipitated metal has accummulated in the bottom of a recovery tank, the drain valve 59 of the tank is opened to dump the metal concentrate into header 60, to flow to thickner 70. The deposited metal may also be loosened and removed from plates 57 by mechanical means, such as scraping, vibrating, impacts, or the like, if desired.

The washer and concentrate thickener 70 has conically tapered sidewall 71, rotary drive 72 driving vertical shaft 73, upper rotating blades or paddles 74, lower blades or scrapers 75 and thickened slurry outlet 76. The recovered metal, wet with leach solution and perhaps containing salts deposited with the metal, is delivered into the washer-thickener. Water for washing is fed into the washer thickener through pipe 77, and is mixed with the metal particles which are kept in suspension. The feed water continuously dilutes the solution and solution overflows the rim of the tank. The metal particles settle to the bottom to be taken out through outlet 76 as a washed concentrated slurry. The type and operation of the washer-thickener is not critical to the invention, and any other washer and thickener of suitable nature may be substituted.

The acid or acids in tank 10 may include any of the acids, hydrochloric acid (HCl), sulphuric acid ($H_2SO_4$), nitric acid ($HNO_3$), Aqua Regia (a mixture of hydrocloric and nitric acids), or any other mixture of the acids may be used. The acid is mixed in solution in water in tank 10. In tank or other supply 14, the base solution may include lithium hydroxide (LiOH), sodium hydroxide (NaOH), potassium hydroxide (KOH), rubidium hydroxide, cesium hydroxide, or ammonium hydroxide ($NH_4OH$), and these materials may be used singly or in any mixture or combination, in water solution. In addition to the above, which are the alkali metal hydroxides, any alkaline earth metal hydroxide, including calcium hydroxide ($Ca(OH)_2$), strontium hydroxide ($Sr(OH)_2$) or barium hydroxide ($BA(OH)_2$) may be used alone or in any mixture or combination. Mixtures of the alkali metal hydroxides and alkaline earth metal hydroxides may be used.

Adequate control of the concentration and pH of the leach solution is necessary for satisfactory operation, and to insure that too much iron is not used up in the recovery chambers during deposition of the metals on the plates 57. Some plate metal is always consumed during metal deposition, so that the plates 57 must be replaced after a period of use, but when proper control of the leach solution is exercised, the plate metal use may be minimized. Efficiency as to plate metal reaction is most important with regard to copper, since copper is of lower value per unit weight than are uranium, gold and silver.

The pH of the leach solution must be maintained between a pH of about 2.0 and a pH of about 4.0, and preferably the pH is about 3.0. The leach solution salt concentration must be sufficiently high that the pH remains in the proper range during ore leaching and during metal deposition on plates 57, and preferably as stable as possible. If the pH is too low, then plate consumption becomes high. If the pH is too high, the metal is not sufficiently leached from the ore, and deposition of metal on plates 57 occurs at a slow rate, if at all.

If leach solution control is good, from about 0.2 pound to about 0.3 pound of plate metal is consumed per pound of copper deposited and recovered. If leach solution pH is too low, below about 2.0, then up to one pound of plate metal per pound of copper, or even more, may be consumed. By comparison, in the older well known processes, wherein copper is leached from ore with sulphuric acid at low pH, and deposited on "tin" cans or junk iron, without buffering or pH control, metal usage is usually in the range of about 2 to 3 pounds of iron consumed per pound of copper recovered, which is from 7 to 15 times higher than in the instant process.

Ore is placed in each compartment 25a–25d of leach tank 25 by any suitable means, not shown. The principal copper ores are as follows:

| | |
|---|---|
| Native copper, Cu | Cuprite, $Cu_2O$ |
| Chalcocite, $Cu_2S$ | Atacamite, $Cu_2Cl(OH)_3$ |
| Bornite, $Cu_5FeS_4$ | Malachite, $Cu_2CO_3(OH)_2$ |
| Chalcopyrite, $CuFeS_2$ | Azurite, $Cu(CO_3)_2(OH)_2$ |
| Covellite, CuS | Antlerite, $Cu_3(SO_4)(OH)_4$ |
| Tetrahedrite, $(Cu,Fe,Zn,Ag)_{12}Sb_4S_{13}$ | Chalcanthite, $CuSO_4 \cdot 5H_2O$ |
| Enargite $Cu_3AsS_4$ | Chrysocolla, $CuSiO_3 \cdot 2H_2O$ |

Ores containing copper in the sulfide form are most abundant and are most important. Ores containing copper in the oxide form are found mostly in surface deposits. The ores often contain uranium, silver and/or gold. Any of these types of ores, and mixtures thereof and ores containing any one or more of the metals, may be treated according to the methods herein described.

Representative chemical reactions which occur during contact of the leach solution with copper-containing ore may be represented as follows:

$$2Cu_2O + 2HCl + 2KOH + 2H_2O \rightarrow 4Cu + 2KCl + 4H_2O + 3O_2 \quad 1.$$

$$2Cu_2S + 2HCl + 2KOH + 2H_2O \rightarrow 4Cu + 2KCl + 2H_2O + 2H_2S (\uparrow) + O_2 \quad 2.$$

$$Cu_5FeS_4 + 2HCl + 2KOH + 3H_2O \rightarrow 5Cu + Fe + 2KCl + H_2O + 4H_2S (\uparrow) + 2O_2 \quad 3.$$

$$2CuFeS + HCl + KOH + H_2O \rightarrow 2Cu + 2Fe + KCl + O_2 + 2H_2S (\uparrow) \quad 4.$$

The presence of the above reactions in the form given has not been positively established, but the presence of the indicated reaction products is evident. At any rate, performance of the process as described results in free copper (and silver and gold) on the plates 57 of recovery tank 41.

In the case of ores other than those indicated in the above chemical reactions, reactions occur in similar manner to result in copper, uranium, gold and silver deposition on plates 57. In any such reactions, with any ore, there will be numerous side reactions with impurities in the ore, the exact nature of which has not been investigated. These side reactions do not interfere with the reactions producing metal deposition, and may be ignored.

Similar chemical reactions occur when acids and acid mixtures, and when bases and base mixtures, other than those specified in reactions (1) – (4) are used. Since the metal (Cu, U, Au, Ag) deposition is the essential result, and does occur, knowledge of the exact reaction forms is not essential to the carrying out of the process.

Uranium occurs in the ores, pitchblende, carnotite, and autunite, and in lesser amounts in igneous rocks, phosphate rocks, lignites, and oil shales, usually as oxides and halides. The leach solutions herein prescribed are effective in dissolving uranium from the ores, and metallic uranium plates out on the plates 57 in the same manner as does copper. Similarly, gold and silver are dissolved and deposited for recovery in the same manner. In most cases, the ores treated will contain copper, together with one or more of uranium, gold and silver, and the metals will be deposited together, to be later separated by a refining process. Treatments of ores containing any one or more of copper, uranium, gold and silver, may be performed according to the invention.

The chemical reactions for uranium, gold and silver are not set out herein, but will be apparent to persons skilled in the art. The forms of the ores of the metals are known to those skilled in the art.

For understanding of the scope of the disclosure, the leach solution may include any one or more of the named acids, together with any one or more of the named bases, and with any of the salts resulting from reactions between the acids and bases and/or other salts added as has been indicated.

For example, sulphuric acid and sodium hydroxide react to form sodium sulphate and water:

$$H_2SO_4 + 2NaOH \leftrightarrows Na_2SO_4 + 2H_2O.$$

As indicated, the reaction is reversible. In addition, $H_2SO_4$ ionizes to $2H^+ + SO_4^=$, and NaOH ionizes to $Na^+ + OH^-$. So there will be present, in solution in the leach liquor, all of $H_2SO_4$, $H^+$, $SO_4^=$, $Na^+$, $OH^-$, and $Na_2SO_4$. In this case, enough $H_2SO_4$ and NaOH should be added so that the $Na_2SO_4$ concentration is high, but not so high as to cause precipitation of $Na_2SO_4$ to occur. Enough excess acid is added to bring the pH to the proper value, between about 2.0 and 4.0, and preferably in the middle of the range. With the salt concentration relatively high, near saturation, the pH will be relatively stable, so that excessive acidity in the leach liquor will not occur to cause excessive plate consumption, and so that the leach liquor will remain acidic sufficient to provide efficient ore leaching. As $H_2SO_4$ reacts to dissolve the ore metal, $Na_2SO_4$ in solution, buffering the solution, provides $SO_4^=$ to continue reaction with the ore, the pH not being much affected because of the high $Na_2SO_4$ concentration. More complexly buffered solutions, with plural acids, bases, and salts may be used.

The leaching or reaction time in leach tank 25 may be from about two hours to about three days. Shorter or longer leaching periods may be used. The type of ore, its physical condition (e.g., particle size), the degree of recovery desired, and other factors, are considered in selecting the leaching time to be employed.

After leaching is completed, the leach liquor is passed through filter tank 38, and then to the recovery tank 41. Subdivided limestone is preferably used as the filtration bed, but other suitable materials, such as sand, gravel, etc., may be used. The leach liquor is fed to the top of the stationary bed of crushed limestone, and is filtered as it percolates down through the bed to the exit. Bed rejuvination and replacement may be attended to in any suitable manner known in the art. Plural filtrations, or other types of filtration, may be substituted.

After leaching, the ore in the leaching tank compartments is replaced. The compartments may be operated simultaneously or serially with leaching completed cyclically to make the overall system continuous, leach liquor being taken from one compartment after the other in series as leaching is completed in each successive compartment.

As the filtered leach liquor flows through recovery tank 41, from the initial chamber 41a to the final chamber 41h, copper (and uranium, silver and gold, if present in the ore,) collects on both sides of each of the plates 57. Periodically, when sufficient loading of metal thereon has accumulated on the plates 57 of one of the chambers 41a–41h, the plates are struck, or shaken, or scraped, or brushed, or otherwise manipulated and the metal thereon drops to the bottom of the chamber. With the drain valve 59 of the chamber opened, the tank contents and loosened metal are drained through pipe header 60 into the washer and concentrate thickener 70 shown in FIG. 1. The tank 41 chamber and plates 57 are washed with water, and the metal is washed free of leach liquor and any other water-soluble materials if such are present, and removed from the thickener as a clean, thickened sludge. Thereafter the recovered metal may be drained, dried, and handled in any conventional manner.

The resulting copper product, which may contain uranium, silver and/or gold, may be processed to remove and recover the uranium, silver and/or gold by processes well known in the art.

The recovered copper may assay from about 75% to about 95% copper, by weight or even higher. Copper recovered by leaching processes is generally of a lower grade than that recovered according to the herein disclosed process. The copper recovered by this process may be salable at almost twice the price of ordinary copper recovered by leaching processes.

As has been mentioned the process is useful for recovery from low grade ores, and plants therefor may be economically established of either large or small capacity, so that a recovery plant of suitable capacity may be located adjacent small deposits of low grade ore so that the copper may be economically recovered, recovery from such low grade ores and small deposits being uneconomical if the ore must be shipped a great distance to the usual large and expensive recovery plant. Therefore, the process is especially suitable for use in recovery of copper, uranium, silver and gold from low grade ores, in relatively small deposits, and located at relatively long distances from established copper recovery facilities.

The plates 57, which are usually made of iron or aluminum, may be of other metals. If copper is to be recovered, the plates 57 may be made of any metal higher than copper in the electromotive series of metals according to chemical activity, e.g., lithium, potassium, calcium, sodium, magnesium, aluminum, manganese, zinc, chromium, iron, cadmium, cobalt, nickel, tin, and lead. Of course, some of the metals of the above list are unusable from a practical standpoint because of their extreme reactiveness and/or poor strength, so that only the less active metals, from magnesium to lead in the series, could be considered for use. No electrical current or voltage is applied to plates 57.

The process as described may be modified in a number of ways. The recovery tank could be omitted, with plates 57 disposed in the leach tank. The filter tank 38 could be omitted or replaced by another type of filter or by a sedimentation apparatus. The process could be operated batchwise, or made completely continuous. Changes of this type will be readily perceived by those skilled in the art after acquiring knowledge of the disclosure herein set forth.

In the case of copper recovery, the following ionic reactions occur:

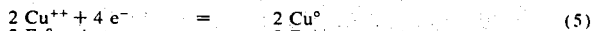
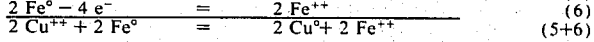

$$2\,Cu^{++} + 4\,e^- = 2\,Cu^\circ \quad (5)$$
$$2\,Fe^\circ - 4\,e^- = 2\,Fe^{++} \quad (6)$$
$$2\,Cu^{++} + 2\,Fe^\circ = 2\,Cu^\circ + 2\,Fe^{++} \quad (5+6)$$

If, for example, copper ore of any kind is leached with leach solution containing from 1 gallon to 5 gallons of concentrated sulphuric acid (98% $H_2SO_4$), per ton of water, and containing sodium hydroxide (NaOH) sufficient to raise the pH to 3.0, then sodium sulphate ($Na_2SO_4$), in sulution, will be formed, and the leach liquor will also contain $H_2SO_4$ in solution and the ions, $H^+$ and $SO_4^{--}$, to the extent of ionization of the free acid, $H_2SO_4$, at pH = 3.0. An ionic balance of all of the constituents will be present. The amount of free acid determines the pH. After leaching of the ore, $Cu^{++}$ will be present, as well as other anions and cations resulting from principal constituents and impurities in the ore. These are variable and in some cases undetermined, and it would be useless to attempt to set down all components in the leach liquor after leaching of an ore. Because of the buffering concentration of the leach liquor, consumption of $H_2SO_4$ by reaction with ore does not result in great alterations of the pH, which remains fairly constant during leaching.

In equations (5) and (6), the potential of the cell containing the $Cu^\circ$ - $Cu^{++}$ and $Fe^\circ$ - $Fe^{++}$ couples may be calculated according to the Nernst equation:

$$E = E^\circ - 0.0592 \log Q/n$$

wherein, $E$ = cell potential, $E^\circ$ = standard cell potential (= difference between the half-cell potentials), 0.440 volts for $Fe^{++}$ and −0.337 volts for $Cu^{++}$, $Q$ = concentration function or ratio, $(Fe^{++}/Cu^{++}) = (10^{-1}/10^{-9})$, at pH = 3.0, $n$ = 2.

Thus, $$E = (0.440 - (-0.377)) - (0.592/2) \log(10^{-1}/10^{-9})$$

$$E = 0.777 \text{ volts} - 0.0296 \log 10^8 \text{ volts}$$

$$E = 0.540 \text{ volts.}$$

In the example, use of one gallon of concentrated $H_2SO_4$ per ton of water results in a less highly buffered solution, than if higher uses up to 5 gallons of concentrated $H_2SO_4$ per ton of water, but the cell potential calculation holds so long as the solution is buffered sufficiently to maintain the pH in the pH = 3.0 range. Better control results, of course, with the leach solution more highly buffered.

After leaching, the liquor was contacted with iron plates, the copper depositing on the plate surfaces in the form of fine granular particles, readily removable from the iron surfaces.

The measured cell potential according to the example was 0.540 volts, the same as calculated according to the Nernst equation. The metal collected assayed 76.2% copper, and according to the weights of the iron plates before and after the copper recovery, the iron consumption was 0.3 pound of iron per pound of recovered copper. 94 percent of the ore copper was recovered.

In other tests, varying pH between 1.0 and 5.0, copper recovery ranged from 60% at pH = 5.0, to 90% or somewhat higher at pH = 3.0, to 95% at pH = 1.0. But at the lower pH = 1.0, iron consumption became excessive. Satisfactory operation was achieved at pH = 2.0 to 4.0, optimum at pH = 3.0. Loss of copper leaching efficiency occurs above pH = 3.0, while iron consumption increases below pH = 3.0, but good copper recovery with non-excessive iron consumption occurs through the range, pH = 2.0 to 4.0, and with sufficient buffering of the leach solution adequate pH control and metal recoveries are achieved.

An electrical current is generated through the leach solution to plates 57, depending in magnitude on the ion concentration of copper (or uranium, gold, silver) in solution. The electrical resistance of the solution with regard to movement of metal ions to plates 57 depends upon the amount of metal ions in solution. As the metal is deposited upon plate 57, the metal ion concentration decreases and the resistance increases. The voltage remains the same, so as the resistance increases the current decreases and the movement of copper ions to plates 57 decreases. Therefore, agitation of the leach solution in contact with the metal plates is necessary for high recovery of the ore metal on the plates. If leach liquor from which ore metal has been deposited is allowed to remain as a layer at the plate surfaces, then resistance for deposition of further copper from leach liquor farther from the plates is high. In the process as described, sufficient agitation is obtained by the velocity of flow of leach solution through the recovery tanks or chambers, there being a head drop between chambers.

Current density through the leach solution is also an important consideration. If the current density is too great, the processes of diffusion and agitation may be too slow to transport copper ions, or ions of other recovered metals, to the electrode surfaces (of plates 57). In that case, the liberation of hydrogen from water consumes a major part of the current at the working electrode. If insufficient plate 57 electrode surface is not provided and maintained, the efficiency of metal recovery drops and more iron goes into solution than would otherwise be the case, the operating costs go up. There is a point of balance or maximum efficiency of operation when correct pH and current density are maintained.

Leach solutions with HCl, $H_2SO_4$, $HNO_3$, and aqua regia employed as the acid, and with NaOH, KOH, $NH_4OH$ employed as the base, have been used in a pilot plant for processing both sulfide and oxide copper ores, and mixtures. The leach time for different runs was varied from 2 hours up to 72 hours, the recoveries being greater with finer grinding of the ore and with the longer leaching times, and with stronger acid and base strengths in the leach solution.

In a number of pilot plant runs, ore was crushed to about pea gravel size, or somewhat larger. Leach solutions of different acid-base-salt compositions highly buffered as herein prescribed were pumped into a tank containing the ore, completely covering the ore. The pH was controlled in the range 2.0 – 4.0. After completion of leaching, the leach solution was drained through a filter tank filled with crushed limestone and then passed into a tank in which four recovery plates were suspended. Iron and aluminum plates were used at different times, and the recovery was the same regardless of which type of plates were used. The recovered metal deposited on the plates, and was easily removed by an impact or by scraping. The metal was washed with water and dried and the amount and analysis determined. The recovered copper product analyzed between 60% and 82% copper (by weight) for each pilot plant run.

Additional runs were made reusing leach liquor from the deposition or recovery tank, with substantially the same results.

The process is a new method of processing copper ore in its original state to produce a form of cement copper. This new approach has some significant advantages over the recovery processes now being used by the copper mining industry. First, the recovery plant for the process is economical to build, requiring a capital investment considerably less than that needed for other processes. Second, the recovery plant for the process is economical to operate. For example, operation is possible with minimal use of iron because the process does not consume the excessive amounts of iron used in current replacement reaction methods. Hauling costs are less because the recovery plant is small enough to be built close to the ore body, the process produces a higher grade of concentrate so that prior to refining, each load contains more copper by weight, and labor costs are lower.

In addition to these advantages, the process combines strict control and extremely efficient operation without the use of externally applied electrical current. The voltage needed to drive the recovery process is self contained and generated solely within the electrolytic solution.

The theory behind the process follows many of the basic chemical principles found in electrolytic deposition. Electrolytic deposition methods are precipitation reactions in the broad sense, in that a solid phase is separated from a solution by forming a deposit on an electrode when current is passed through the solution. Electrolytic deposition is currently used two ways in chemical and commercial applications, by separation of specific electroactive material in solution, determination of electroactive material in solution. The process provides for the commercial recovery of copper and other metals having electrode potentials below that of hydrogen in the activity series of metals.

An explanation of the process requires a basic understanding of the nature of electrode processes. When a metal is placed in contact with a solution of its ions, a potential (voltage) develops between the metal electrode and the electrolyte solution because of the tendency of the metal to lose electrons and be oxidized to the ionic condition, or the tendency of the ions to gain electrons and be reduced to metal. The reversible change involved may be represented by the general equation $$M = M^{n+} + ne$$

where $n$ is the number of electrons involved and also the charge on the cation. (this general equation represents) a half reaction that is characterized by a certain potential which is a measure of the tendency of the system to lose electrons to, or gain electrons, from other systems.

There are two such systems at work in the process. An electrode-potential cell is formed when acidic leaching solution containing $Cu^{++}$ ions is in a recovery tank with iron electrode plates. The term, "electrode-potential" is used because the cell is neither a galvanic cell with separate solutions and a salt bridge, nor is it an electrolysis cell with an externally applied potential. The reaction in this electrode-potential cell is an oxidation-reducion reaction, and it follows the previously discussed electrode process principle. The Fe electrode plates have a tendency to send $Fe^{++}$ ions into solution through oxidation. Because Fe has an electrode potential above that of hydrogen in the activity series of metals, sufficient potential (voltage) is supplied to reduce the $Cu^{++}$ ions in the solution to $Cu^\circ$. During this reduction phase of the reaction, the $Cu^{++}$ oxidizes the $Fe^\circ$ to cause additional formation of $Fe^{++}$ ions.

It should be noted that the process is an incomplete electrolytic deposition reaction in the sense that the $Cu^\circ$ does not plate on the $Fe^\circ$ electrode as would be expected in a constant voltage electrolysis reaction. In constant voltage electrolysis an externally applied potential of 1.91v is required for the complete plating of $Cu^\circ$. The plating of $Cu^\circ$ on an electrode is not desired in the process, and electroplating is discouraged by avoiding the use of an inert electrode such as platinum and avoding the use of an externally applied potential. Adherence to the electrode is the most important physical characteristic of a deposit. Generally a smooth deposit and adherence are congruent. Flaky, spongy, or powdery deposits adhere only loosely to an electrode. It is precisely this powdery deposit adhering loosely to the electrode that accounts for the high grade cement copper that is recovered with the process.

The recovery solution is a buffered leaching solution of water and $H_2SO_4$ ranging from 1 gallon to 5 gallons of acid per ton of water which is used to leach the copper ore. Once the $Cu^{++}$ ions are present, in a concentration ranging from 2 pounds to 10 pounds per ton of solution, this pregnant solution contains a certain amount of free acid and a certain concentration of $Cu^{++}$ ions. The amount of free acid determines the pH of the solution, and the $pH^+$ should be between 2 and 4 in order to control the amount of $Fe^{++}$ ions undergoing oxidation and to avoid the precipitation of metal salts that would interfere with the recovery process. The pH can be controlled by the addition of acid or an appropriate base such as NaOH. When the pH of the recovery solution is achieved within the limits of the desired range, the level is maintained by buffers (salts) which tend to stabilize the pH level and build up the electrolyte concentration of the solution, and to increase the solubility of dissolved metal salts. Solubility measurements on slightly soluble ionogens have shown that they are more soluble in solutions of salts than they are in water, even though no chemical reaction occurs with the ions of the soluble salts. For example, silver chloride and barium sulfate are more soluble in potassium nitrate solution than they are in water. This influence is known as the diverse ion effect, or sometimes as the neutral salt effect. The solubility of a slightly soluble ionogen is dependent upon all the ions. of whatever kind, in the solution. The addition of a buffering electrolyte also functions in another way. In some cases, a migration current develops in the electrode potential cell—that is, a negative charge develops that takes the ions away from the electrode. The whole effect of the migration current can be eliminated by adding a relatively large quantity of inert electrolyte which does not interfere with the electrode process.

Several conditions invluence the efficiency of copper recovery in the process:

Concentration: The Nernst equation relates the potential in the process to the concentration of the reactants. The relative potential values listed in the activity series of metals are true only when the reactants are at the standard state of activity or 1 molar concentration. The process handles copper concentrations considerably less than 1 molar.

Agitation and Elevated Temperature: After the process has continued for a short time, the solution in the immediate vicinity of the electrode may become depleted in the reducible ion, and the reaction may slow down. Agitation eliminates this problem by lowering the concentration overpotential and enabling a higher current density to be employed without deleterious results. Heating sets up convection currents in the solution which have much the same effects, qualitatively, as agitation. In addition, all reactions are more rapid at higher temperature, so that the recovery can be completed in a shorter time.

Current Density: High current density (high rate of electrodeposition) may result in depletion of the reducible ion at the electrode surface, with the same results as in the absence of agitation. Current density is usually defined as the current in amperes per square centimeter of electrode surface.

Electrode Condition: If the electrode surface is roughened, the overpotential at a given current density decreases.

While preferred embodiments of the invention have been shown and described, many modifications thereto may be made by a person skilled in the art without departing from the spirit of the invention, and it is intended to protect by Letters Patent all forms of the invention falling within the scope of the following claims defining the invention.

We claim:

1. Method for recovery from ores of one or more metals selected from the group consisting of copper, uranium, gold, and silver, comprising leaching an ore with an aqueous leach solution containing one or more salts formed from one or more acids selected from the group consisting of HCl, $H_2SO_4$, and $HNO_3$ and one or more bases selected from the group consisting of the alkali metal hydroxides and the alkaline earth metal hydroxides and ammonium hydroxide with water, and containing a controlled excess of said one or more acids whereby the pH of said leach solution is in the range from about pH = 2 to about pH = 4, to dissolve metal from the ore, contacting said metal-containing leach solution with spaced metal plate means to which no external current or voltage is applied formed of metal selected from the group consisting of the metals from magnesium to lead, inclusive, in the electromotove series of metals according to chemical activity to deposit said ore metal on said metal plate means, control of the pH of the leach solution in the stated range causing deposition of a greater than stoichiometric amount of ore metal on said metal plate means relative the amount of plate metal dissolved in the leach solution.

2. Method according to claim 1, said leach solution pH being controlled at about pH = 3.

* * * * *